United States Patent [19]
Kobrehel et al.

[11] Patent Number: 5,915,780
[45] Date of Patent: Jun. 29, 1999

[54] ENCAPSULATED PLASTIC GLAZING WINDOW MODULE

[75] Inventors: Michael D. Kobrehel, Elkhart; Virginia C. Vanark, Mishawaka, both of Ind.

[73] Assignee: Excel Industries, Inc., Elkhart, Ind.

[21] Appl. No.: 08/810,879

[22] Filed: Mar. 5, 1997

[51] Int. Cl.$^6$ ........................................................ B60J 1/12
[52] U.S. Cl. ................. 296/146.15; 296/201; 296/96.21; 52/208
[58] Field of Search .............................. 296/201, 146.15, 296/96.21, 215, 901; 52/208, 204.591, 204.59

[56] References Cited

U.S. PATENT DOCUMENTS

| | | | |
|---|---|---|---|
| 3,282,014 | 11/1966 | Bamford et al. | 52/204.597 |
| 3,981,113 | 9/1976 | Griffin | 52/204.591 |
| 4,335,552 | 6/1982 | Blanchett et al. | 52/204.597 |
| 4,571,278 | 2/1986 | Kunert | 52/204.597 |
| 4,635,420 | 1/1987 | Batky . | |
| 4,681,794 | 7/1987 | Kunert et al. | 52/204.597 |
| 4,768,319 | 9/1988 | Derner | 52/208 |
| 4,858,988 | 8/1989 | Morgan et al. | 296/96.21 |
| 4,968,543 | 11/1990 | Fujioka et al. | 52/208 |
| 5,035,096 | 7/1991 | Otake et al. . | |
| 5,062,248 | 11/1991 | Kunert | 296/201 |
| 5,154,028 | 10/1992 | Hill et al. . | |
| 5,193,875 | 3/1993 | Tamura | 52/204.597 |
| 5,339,584 | 8/1994 | Ohtake et al. | 296/146.15 |
| 5,419,088 | 5/1995 | Raymond et al. . | |
| 5,815,997 | 10/1998 | Cornils et al. | 52/208 |

Primary Examiner—Joseph D. Pape
Assistant Examiner—Kiran Patel
Attorney, Agent, or Firm—Banner & Witcoff, Ltd.

[57] ABSTRACT

An encapsulated plastic glazing window module for a motor vehicle has a glazing assembly formed from a transparent plastic glazing substrate and a frit film positioned on at least a portion of the glazing substrate, an encapsulation frame encapsulating the glazing assembly and attachment means such as mounting studs and/or adhesives for securing the glazing assembly to the motor vehicle. In certain preferred embodiments the transparent plastic substrate is a polycarbonate, and the frit film is a semi-rigid sheet having a transparent polycarbonate carrier web with a non-transparent ink or dye. In certain embodiments the frit film is positioned on an interior side of the plastic substrate and the non-transparent portion covers the attachment means from exterior view. An abrasion resistant coating or hardcoat such as an organically modified ceramic is preferably to each surface of the glazing assembly, preferably by dip coating. The encapsulation material is preferably a PVC or similar thermoplastic. In certain preferred embodiments a peripheral integrity insert is insert molded around a peripheral edge of the glazing assembly, facilitating embedding mounting studs in the encapsulation frame. In certain preferred embodiments the plastic substrate has a series of radially extending projections and a perimeter ring defining a series of vents and the encapsulation material forms a mechanical bond with the plastic substrate. The encapsulated plastic glazing window modules may optionally be positioned flush with an exterior surface of the motor vehicle.

27 Claims, 4 Drawing Sheets

ENCAPSULATED PLASTIC GLAZING WINDOW MODULE

FIELD OF THE INVENTION

The present invention generally relates to improved window designs incorporating plastic glazing, and more particular to plastic glazing modules suitable for use in motor vehicles.

BACKGROUND OF THE INVENTION

Glass window modules commonly used in the automotive industry typically comprise a sheet of glass, often bent into a curvo-planar shape, an encapsulation material such as a reaction-injection- molded (RIM) polyurethane or a polyvinyl chloride (PVC) positioned around a peripheral edge of the glass, and attachment means for securing the module to a motor vehicle. Often a primer is needed to enhance the bonding between the glass and the encapsulation material.

The automotive glass used in window modules is manufactured in flat sheets. The flat sheets are cut to size and optionally a frit is applied, typically around the periphery of the glass. Frit is important for decoration and exterior styling, principally to hide from view what may be positioned behind the frit, such as, for example, attachment means for securing the window module to a motor vehicle body panel, etc. Frit is normally applied by a silk-screen process to the flat sheets of glass. The flit is applied to the glass and then heated to cure the frit and bond it to the glass. The frit used in automotive applications is typically glass in particulate form, such as a bismuth-borosilicate glass particulate, generally of controlled size distribution, with a liquid carrier, and a non-transparent additive such as an iron oxide to produce an opaque dark color and act as the covering agent.

Plastic glazing modules have been considered as a replacement for glass window modules in automotive applications. One of the principal identified advantages is weight reduction, with correspondingly improved vehicle fuel economy. Additionally, window modules having transparent polymeric materials such as acrylics and polycarbonates allow complex bends unacheivable by conventional glass modules while maintaining required properties such as clear optics, low and substantially uniform stress and reduced weight. The change from glass to plastic glazing panels however, introduces new problems such as frit application, scratch resistance and control of the molding process. One recently attempted solution for some of the problems of plastic glazing window modules is shown in U.S. Pat. No. 5,035,096 to Ohtake et al. Ohtake et al shows a synthetic resin windowpane having a window body portion and a frame portion. The frame portion is hollowed out by a gas-assist injection molding process. This design has various disadvantages. The injection molding process producing the window shape has to be carefully controlled to prevent areas of high stress from developing in the part, especially around the perimeter of the window body portion where it joins the frame portion. Such stresses can lead to optical distortions and aesthetically unappealing deformities. Also, use of a gas-assist injection molding technique can produce non-uniform wall thicknesses producing localized high stress areas which lead to optical distortions, surface dimples or other unattractive exterior deformities.

Plastic glazing modules have other problems not anticipated or identified with glass modules. Transparent plastics are susceptible to scratching and other damage, e.g., clouding resulting from prolonged exposure to ultraviolet (UV) radiation. UV stabilizers can be applied to or incorporated into the plastic glazing, as well as an abrasion resistant material or hardcoat to resist scratching. Ohtake et al suggests a hardcoat painted onto the window body portion and an opaque layer painted onto an exterior side of the frame portion to hide the hollowed out portion behind it. This is disadvantageous for at least the following reasons. First, the opaque layer on the frame portion is subjected to the elements and may be scratched off or flake off, potentially exposing the transparent substrate below. Second, the hardcoat does not cover the interior of the window module, creating the potential for scratching on the interior. Third, each surface has a different gloss or shininess: the paint on the exterior of the motor vehicle has a first gloss; the opaque layer has a second gloss; and the abrasion resistant coating has a third gloss. Three different glosses so close to one another produces an aesthetically unappealing striped appearance to the exterior of the vehicle. Fourth, the abrasion resistant material or hardcoat is typically the most expensive (by volume) material in a plastic glazing module, and a painting process can waste significant amounts of hardcoat material.

Another problem with plastic glazing modules is that traditional frit used on glass cannot be used on the non-flat surfaces demanded for current automotive window applications in that bleeding of the frit can occur. Moreover, to cure the frit the window module is heated to temperatures which can damage the plastic glazing substrate. Painting a frit-like material onto a plastic glazing substrate introduces additional problems, as the paint can be difficult to accurately control and it can be difficult to produce aesthetically acceptable patterns such as a gradual fade. Furthermore, it may be difficult to ensure proper bonding between the paint and the plastic substrate. It would be highly advantageous to produce plastic glazing for motor vehicle applications having a suitable frit-like material having an aesthetically pleasing appearance and allowing stylistic freedom in creating patterns.

Another problem with the use of transparent plastics as a replacement for glass in windows is that the tensile strength of the available transparent plastics is significantly less than glass. This problem is particularly apparent near mechanisms that are embedded or otherwise secured to the transparent plastic, such as attachment means used to attach the glazing module to a motor vehicle body. In conventional automotive glass window modules attachment mechanisms often comprise adhesives at the perimeter of the glazing with a series of spaced mounting studs. If such a technique were used with a plastic glazing module, the unsupported area of the plastic glazing between the mounting studs can bow away from the adhesive bonding. Furthermore, dimples or depressions can appear on the exterior surface of plastic glazing modules employing mounting studs either directly embedded in the transparent plastic or embedded in an encapsulation material. It would be highly advantageous to have a plastic glazing module that can incorporate mounting studs into encapsulation material without resultant dimples or bowing of the plastic substrate.

In view of the foregoing, it is an object of the present invention, to provide an encapsulated plastic glazing module. It is an additional object, at least in preferred embodiments, to provide an encapsulated plastic window module of reduced cost and complexity while enhancing manufacturability. It is another object of the present invention, at least in certain preferred embodiments, to provide an encapsulated plastic glazing window module wherein mounting studs can be embedded in the encapsulation material without dimples or bowing appearing on the module. It is yet another related object of the present invention to provide such an encapsulated plastic glazing module that is highly reliable in operation.

SUMMARY OF THE INVENTION

There is provided an encapsulated plastic glazing window module suitable for closing an opening in a motor vehicle, comprising a glazing assembly formed from a transparent plastic glazing substrate. The plastic glazing can be injection molded onto a frit film. The flit film can be positioned on at least a portion of the glazing substrate. The frit film has a carrier web supporting a generally non-transparent area, more specifically, a selected area of the carrier web has a generally non-transparent portion so as to be substantially opaque. The corresponding region of the plastic glazing substrate can therefore, act as a sight shield for example, for componentry such as attachment means for securing the glazing assembly to the motor vehicle. Preferably a thermoplastic material, such as PVC encapsulates a periphery of the glazing assembly forming a peripheral frame. The encapsulation can be either conventional three-sided, where encapsulation material bonds to a portion of an interior surface, an exterior surface and a perimeter surface of the glazing assembly, two-sided, or one-sided, where the encapsulation material typically bonds to just the interior surface. A primer may be used to enhance bonding between the encapsulation material and the glazing assembly, particularly on one-sided modules. The exterior surface of the glazing assembly preferably has a uniform gloss and may be positioned generally flush or aligned with the surrounding exterior surface of the motor vehicle.

As noted above, the frit film can be used to stylishly conceal objects positioned behind it. In typical automotive applications this means hiding from exterior view attachment means for securing the glazing assembly to the motor vehicle, as well as portions of the motor vehicle near the edge of the glazing assembly. The frit film of the encapsulated plastic glazing window modules disclosed herein preferably is a semi-rigid sheet, (i.e, the frit film is substantially self-supporting and non-destructively bendable) comprising a non-transparent ink or dye. The non-transparent material can be transferred in-mold from a polyester film to a carrier web of generally transparent material. The carrier web preferably is a polycarbonate or vinyl. Advantageously, the non-transparent portion of the frit film can be accurately controlled, allowing for styling freedom to produce aesthetically appealing designs, such as, for example, a transition semi-transparent portion or a gradual fade from the transparent portion to the non-transparent portion. The frit film can be incorporated as an integral part of the encapsulated plastic glazing window module as a sheet covering at least a portion, typically a peripheral portion of an interior side of the plastic glazing substrate, with the non-transparent portion positioned to cover and hide attachment means securing the glazing assembly to the motor vehicle. Optionally, the frit film can be cut to remove a center portion, leaving a peripheral portion to be bonded to the plastic substrate.

Preferably an abrasion resistant coating or hardcoat is applied to the glazing assembly, most preferably as an all over coating such as by dip coating the glazing assembly in the liquid hardcoat solution, followed by drying or otherwise curing the hardcoat. Advantageously, this process coats each surface of the glazing subassembly, producing an aesthetically appealing uniform gloss over the entire surface while also in one operation providing scratch protection for both the exterior and interior surfaces.

In accordance with another aspect, the plastic glazing substrate has unitary radially extending projections and a perimeter ring form a mechanical interlock with the encapsulation material of the encapsulation frame. These projections and perimeter ring form a series of vents which receive the encapsulation material to form a positive mechanical interlock between the plastic substrate and the encapsulation material. Advantageously, such a positive mechanical interlock can eliminate or greatly reduce the need for a primer between the plastic glazing substrate and the encapsulation frame.

In accordance with another aspect as further discussed below, a peripheral integrity insert is used in the encapsulated plastic glazing window module. Preferably such a peripheral integrity insert may be positioned by insert molding in the encapsulation material. This insert allows the use of mounting studs embedded in the encapsulation material to be used as attachment means without producing dimples or other deformations in the window module. Preferably the peripheral integrity insert is C-shaped, and is positioned near the mounting studs.

It should be understood that the term "transparent", as used in this application with regard to the frit film and the transparent glazing layer does not mean that the plastic glazing modules allow 100% of solar energy received to pass through to the interior of the motor vehicle. Nor does the term "non-transparent" refer to the complete blockage of solar radiation. Rather, transparent as applied to the plastic glazing substrate and frit film simply means that a person with normal vision can readily see objects behind the film and the substrate, and non-transparent means that a person generally cannot see through or behind such film or substrate.

From the foregoing disclosure and the following more detailed description of various preferred embodiments it will be apparent to those skilled in the art that the present invention provides a significant advance in the technology and art of plastic glazing window modules. Particularly significant in this regard is the potential the invention affords for simplifying manufacturing steps and complexity. Additional features and advantages of various preferred embodiments will be better understood in view of the detailed description provided below.

Figure 1:
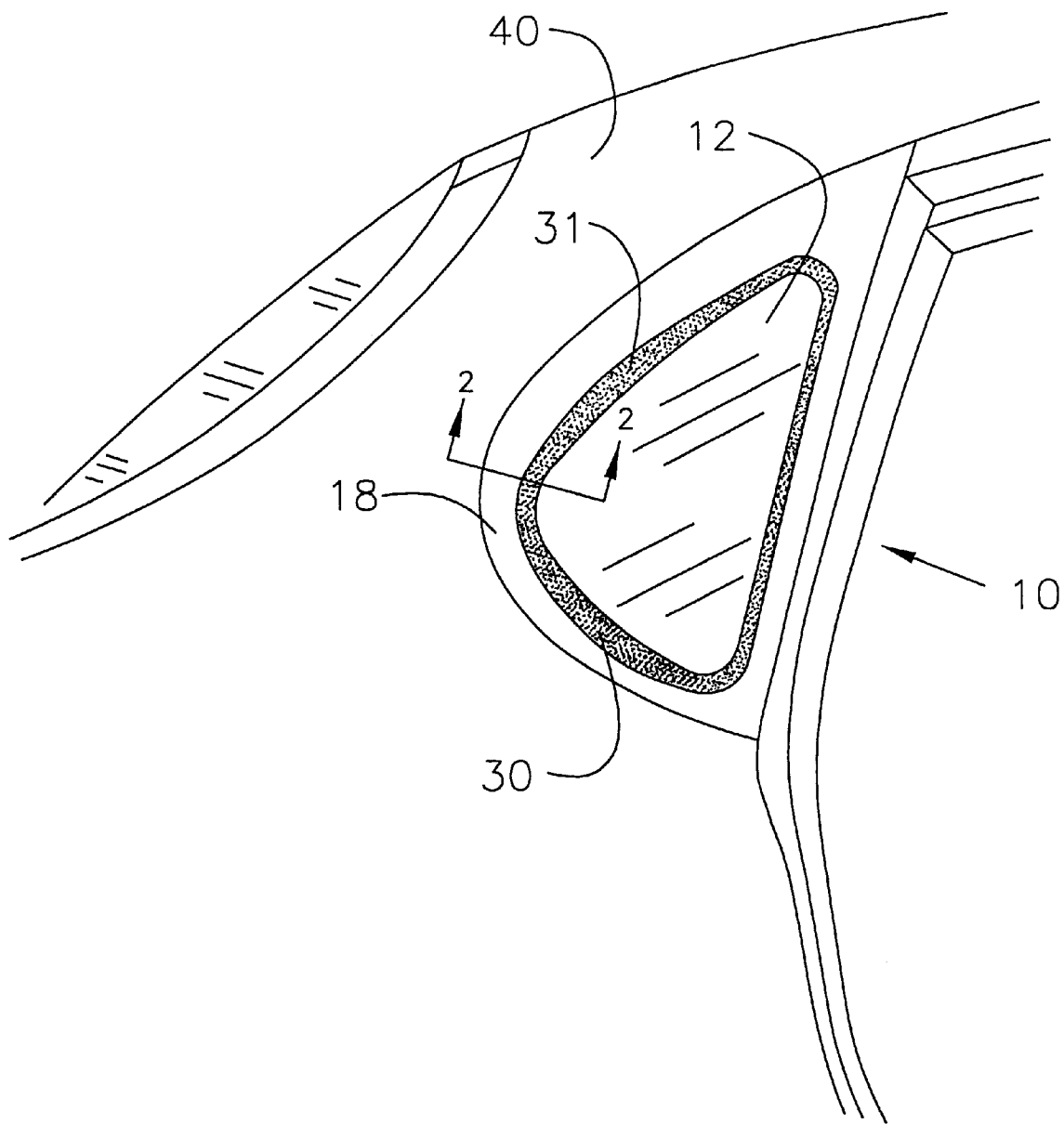
FIG. 1 is an exterior perspective view of an encapsulated plastic glazing window module for a motor vehicle shown installed in a motor vehicle body opening.

It should be understood that the appended drawings are not necessarily to scale, presenting a somewhat simplified representation of various preferred features illustrative of the basic principles of the invention. The specific design features of the encapsulated plastic glazing window modules disclosed here, including, for example, the cross sectional thickness of the transparent plastic substrate, the specific composition of the frit film, the hardcoat and the encapsulation material will be determined in part by the particular intended application and use environment. Certain features of the illustrated embodiments have been enlarged or distorted relative to others to facilitate visualization and clear understanding. In particular, thin features may be thickened for clarity of illustration, as for example the abrasion resistant coating. All references to direction and position, unless otherwise indicated, refer to the orientation of the window module illustrated in the drawings. In general, lateral or laterally refers to a rightward or leftward direction in the plane of the paper in FIG. 1, and up, down or vertical refers to corresponding directions in the plane of the paper in FIG. 1. The same reference numerals are used in the drawings to identify identical features of different preferred embodiments.

DETAILED DESCRIPTION OF CERTAIN PREFERRED EMBODIMENTS

It will be apparent to those skilled in the art, that is, to those who have knowledge or experience in this area of technology, that many design variations are possible for the plastic glazing window modules disclosed herein. The following detailed discussion of various alternative and preferred features and embodiments will illustrate the general principles of the invention with reference to an encapsulated plastic glazing window module suitable for use in a motor vehicle. Other embodiments suitable for other applications will be apparent given the benefit of this disclosure.

Figure 2:
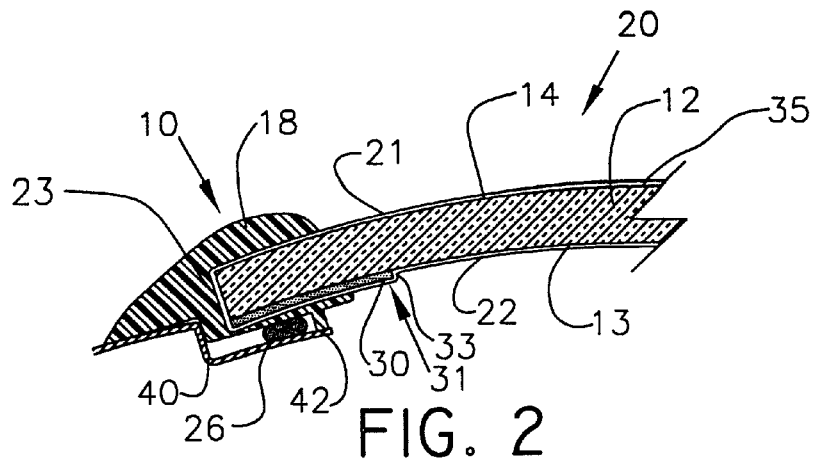
FIG. 2 is a cross sectional view enlarged and partially broken away of a preferred embodiment of an encapsulated plastic glazing window module installed as in FIG. 1 corresponding to a view taken along line A—A of FIG. 1 showing three sided encapsulation and a frit film.

Referring now to the drawings, FIG. 1 is a perspective view of a fixed encapsulated plastic glazing window module 10 positioned behind a rear door for closing a motor vehicle opening 44 in accordance with a preferred embodiment. Such fixed windows are often referred to as quarter windows. FIGS. 2–5 show cross sectional views of alternative preferred embodiments of encapsulated plastic glazing window modules corresponding to a view taken along line 2—2 in FIG. 1. FIG. 2 shows a preferred embodiment of a three-sided encapsulated plastic glazing module 10. The module has a glazing assembly 20 having an exterior surface 21, and interior surface 22 and a perimeter surface 23; a encapsulation material 18 encapsulating the glazing assembly; and an adhesive 26 for securing the glazing assembly to the motor vehicle wall 40. Other suitable attachment means will be apparent to those skilled in the art given the benefit of this disclosure. In accordance with current customer demands regarding exterior styling, the glazing assembly is preferably curvo-planar, and more specifically has curves which follow the curve of the sheet metal 40 of the motor vehicle. The glazing assembly 20 comprises a transparent plastic substrate 12 having interior 13 and exterior sides 14, which is injection molded onto a frit film 30. The substrate includes a transparent plastic and may also include UV stabilizers. Suitable transparent plastics include, e.g., polymethyl methylacrylates (acrylics) and polycarbonates. Polycarbonates, which are a polyester of carbonic acid, generally have better impact strength than acrylics and have good mold shrinkage and creep characteristics. Other suitable transparent plastics will be apparent to those skilled in the art in view of this disclosure.

In a highly advantageous feature, the frit film 30 is a semi-rigid sheet having a non-transparent area 31 of an otherwise transparent carrier web 33 of vinyl or polycarbonate. The non-transparent area preferably comprises a ink or dye which is transferred in-mold from a polyester film. In certain preferred embodiments the carrier web may have a transparent portion 32. Examples of a polycarbonate suitable for use as a carrier web of a frit film include Makrolon™ from Bayer Corporation, Pittsburgh, Pa. Advantageously for exterior styling, the non-transparent portion of the frit film can be controlled with greater accuracy than traditional painting methods. Also, such preferred frit film readily bonds to the injection molded plastic substrate 12 so as to be embedded therein to form a laminated curvo-planar shaped glazing assembly.

The frit film is preferably positioned on the interior side 13 of the transparent plastic substrate 12, with the non-transparent portion covering and hiding the attachment adhesive and the periphery of the motor vehicle opening. As seen in the preferred embodiment of FIG. 3, the carrier web 133 may comprise a solid sheet covering all or nearly all of the interior side 113 of the transparent plastic substrate 112 with the frit film 130 applied around a periphery of the carrier web, or as seen in the preferred embodiment of FIG. 2, a die punch may cut out most or all of the transparent portion of the carrier web 33 leaving principally the non-transparent portion. Optionally the frit film can have a transition portion from non-transparent to transparent, allowing for a significant degree of styling freedom.

Since transparent plastic glazing in general and polycarbonate in particular is susceptible to scratches it is preferable to apply an abrasion resistant coating 35 or hardcoat. Preferably the hardcoat is in liquid solution form, most preferably the glazing assembly 20 is spray coated, flow coated or dip coated. In dip coating, the glazing assembly is dipped into the hardcoat solution. Advantageously, the excess material is recovered and reused, as the hardcoat is generally the most expensive component by volume of the encapsulated plastic glazing window module. Coating each surface of the glazing assembly advantageously produces a uniform gloss across the module, greatly enhancing its aesthetics. The hardcoat can greatly increase light transmittal through the encapsulated plastic glazing window module in response by a standard Taber abrasion test known to those skilled in the art. Polysiloxanes are suitable as hardcoat materials. More preferred are organically modified ceramics, such as Ormocer™ available from Bayer Corp. In accordance with a highly advantageous feature of a preferred embodiment, organically modified ceramics disclosed here use are preferred for use as a dip-coated hardcoat on encapsulated plastic glazing window modules. Such organically modified ceramics differ from siloxane coatings in that their curing involves polymerization of organic components in addition to the condensation of inorganic constituents. In the finished hardcoat, the organic components are bound to the inorganic network by silicon-carbon bonds. The two component system of organically modified ceramics bonds well to the plastic substrate and to the frit film of the preferred embodiments disclosed above. Other suitable hardcoat materials will be apparent to those skilled in the art given the benefit of this disclosure.

Figure 3:
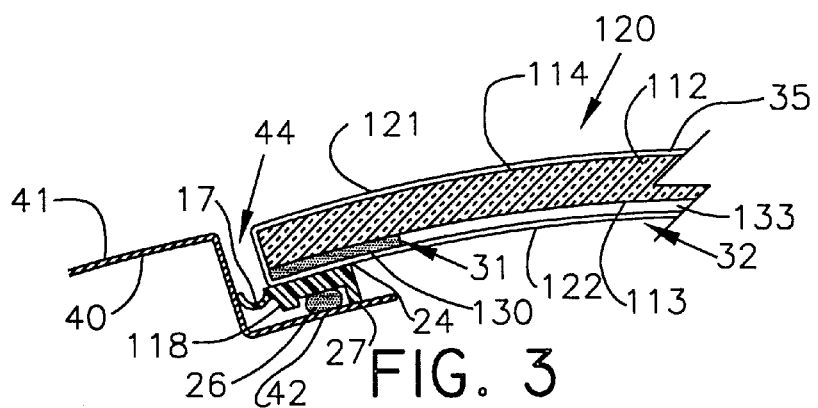
FIG. 3 is a cross sectional view of an alternative preferred embodiment of an encapsulated plastic glazing window module corresponding to the view of FIG. 2 showing the module positioned generally flush with an exterior surface of the motor vehicle.

FIGS. 2 and 3 are alternative preferred embodiments showing encapsulation of a glazing assembly with an encapsulation frame. The encapsulation material 18 is positioned on a circumferential perimeter of the glazing assembly, which includes at least a portion of the interior surface 22 near a perimeter edge 23 and can include both the perimeter edge and a portion of the exterior surface 21 near the perimeter edge 23 of the glazing assembly. In FIG. 2 the encapsulation frame is three-sided, that is the encapsulation material 18 is molded onto and attaches via surface bonding to the perimeter including the exterior surface and the perimeter edge of the glazing assembly. FIG. 3 shows the encapsulated plastic glazing window module with a one-sided encapsulation frame, wherein the encapsulation material 118 is molded onto and attaches via surface bonding to part of the peripheral portion of the interior surface 122. One-sided bonding advantageously allows the encapsulated plastic glazing window module to be positioned generally flush with an exterior surface 41 of the motor vehicle wall 40. The glazing assembly 120 is adhesively attached to a peripheral ledge 42 of the motor vehicle wall 40, and optionally a flexible lip 17 of encapsulation material extends into space 44 to meet the wall to allow for manufacturing tolerances between the wall and the plastic glazing. Optionally a primer 24 may be used to enhance bonding between the encapsulation material 118 and the glazing assembly 120.

Figure 4:
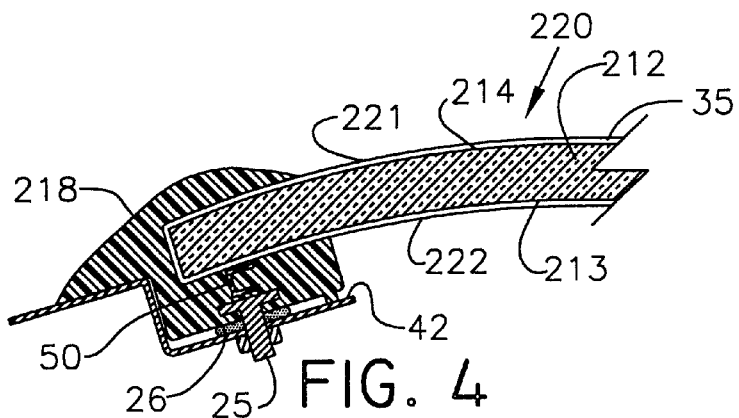
FIG. 4 is a cross sectional view of an alternative preferred embodiment of an encapsulated plastic glazing window module showing a peripheral integrity insert positioned within the encapsulation material.

FIG. 4 shows a preferred embodiment of an encapsulated plastic glazing window module wherein the attachment means comprises mounting studs 25 with an adhesive 26. Stresses on the part can cause optical defects or aesthetically unappealing deformations. To maintain low stresses and to evenly distribute stresses, an insert molded peripheral integrity insert 50 is positioned in the encapsulation material 218 generally near circumferentially spaced mounting studs 25. The insert 50 helps prevent bowing of the perimeter of the glazing assembly 220, and helps prevent dimples near the mounting studs or other distortions. Preferably insert 50 follows the circumferential perimeter of the glazing assembly 220, embedded within the encapsulation material 218 of the frame, and has a C-shaped cross section. Other suitably shaped stress-relieving inserts will be apparent to those skilled in the art given the benefit of this disclosure.

Figure 5:
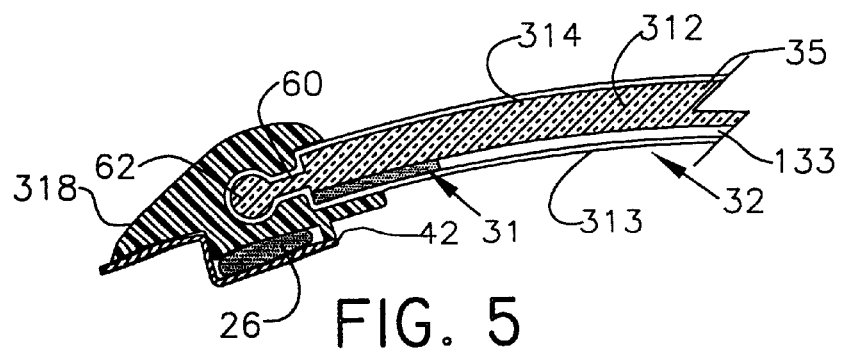
FIG. 5 is a cross sectional view of an alternative preferred embodiment of an encapsulated plastic glazing window module showing the transparent glazing having radially extending fingers and a peripheral ring providing a mechanical interlocking bond to the encapsulation material.
Figure 6:
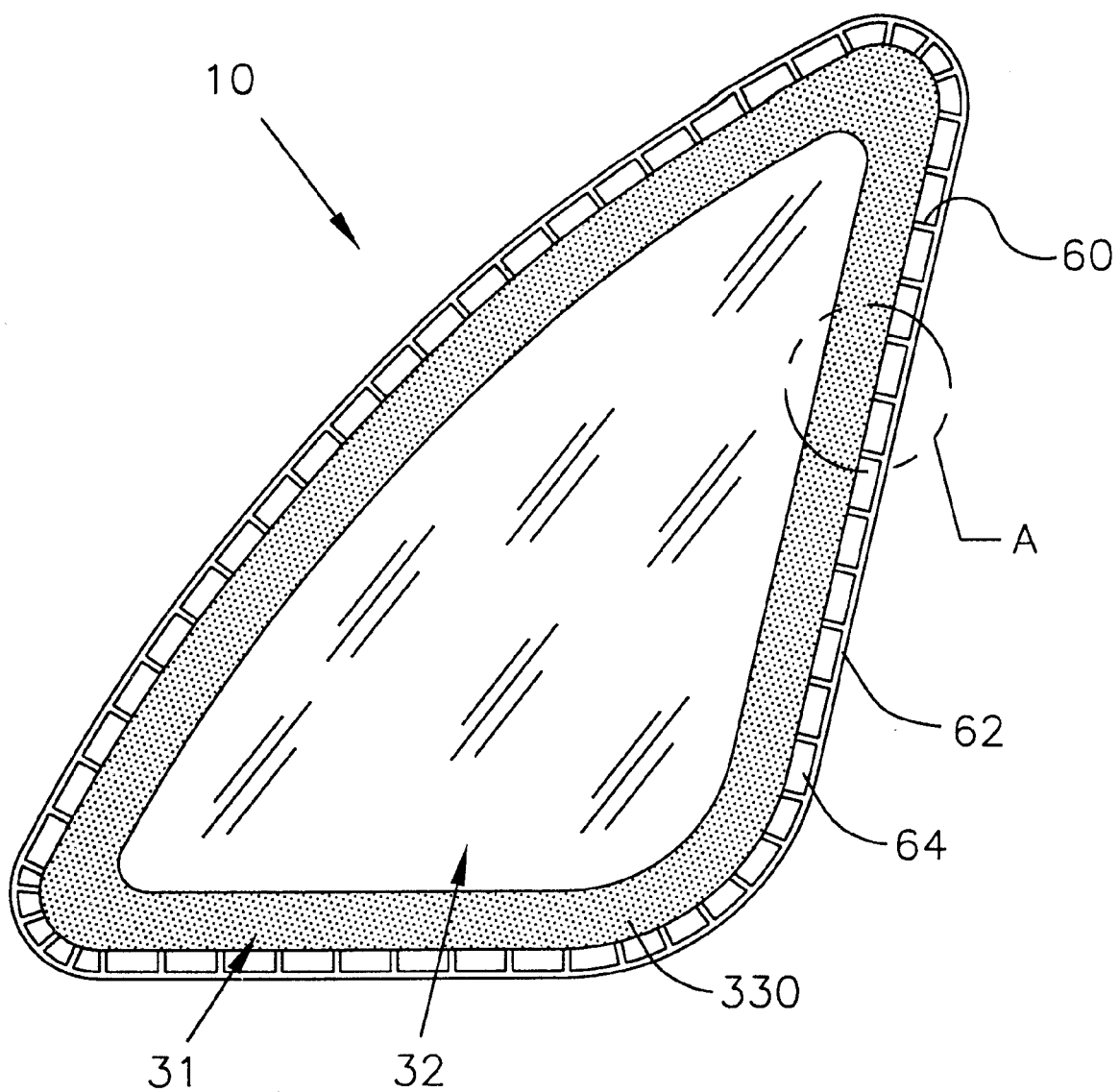
FIG. 6 is an elevation view in reduced scale of the alternative preferred embodiment of FIG. 5 with the encapsulation material removed to show radially extending fingers and the peripheral ring of plastic glazing.
Figure 7:
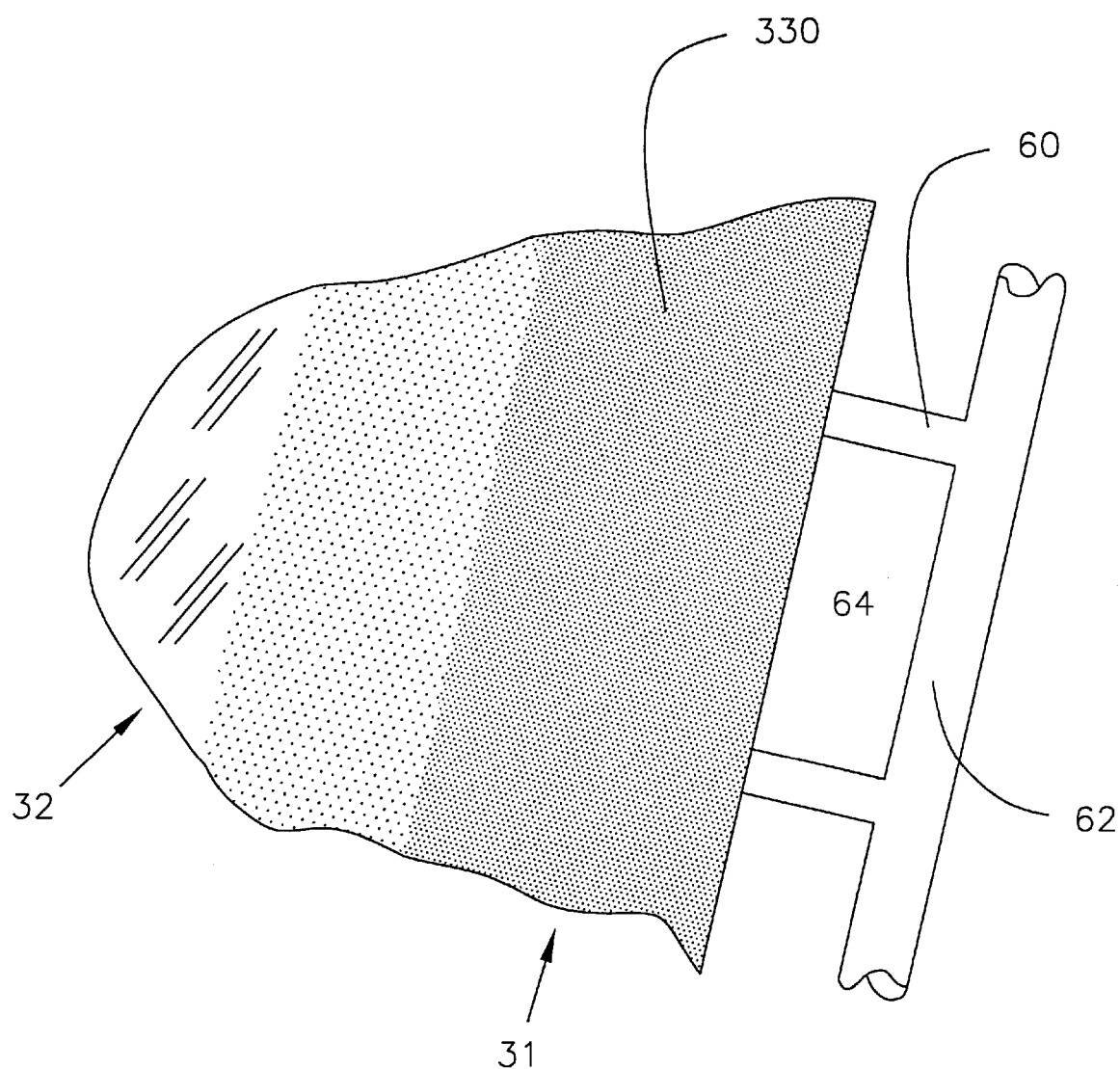
FIG. 7 is an enlarged section of FIG. 6, showing fingers and the peripheral ring of the alternative embodiment of FIGS. 5 and 6.

FIGS. 5–7 show a design for an encapsulated plastic glazing window module which would be extremely difficult to mass produce using glass, but which can be readily and repeatably made using transparent plastic by an injection molding process. The transparent plastic glazing is seen to have radially extending projections or fingers 60 and a perimeter ring 62 unitary with the substrate 312, defining a series of vents 64. When the glazing assembly is encapsulated, the encapsulation material 318 is heated to a near liquid state and flows into and fills the vents 64. When the encapsulation material hardens a positive mechanical interlock is formed between the glazing assembly 320 and the encapsulation material 318, which greatly reduces or eliminates the need for a primer. Other configurations extending from the plastic glazing substrate which have a positive mechanical interlock will be apparent to those skilled in the art given the benefit of this disclosure. An optical carrier web 133 with a transparent portion 32, a non-transparent area 31 and frit film 330 can be provided in much the same manner as the previous embodiments showing the use of frit film.

Suitable encapsulation materials include RIM, PVC, thermoplastic olefin (TPO), etc. RIM material can leak between the mold and the glazing assembly. This leaking material is known as flash, and is typically cut away with a razor or other sharp tool. Such a cutting tool, however, may scratch the transparent plastic glazing. It is therefore preferable to encapsulate plastic glazing with a PVC, a (TPO), or other similar controllable thermoplastic where leaking is minimized.

Advantageously the use of transparent plastic glazing allows for complex curvo-planar shapes, such as saddle shapes or other shapes where two or more portions of the transparent plastic glazing substrate are positioned at generally right angles to at least one other portion of the plastic glazing substrate, optionally meeting in a radiused curve. Optionally a module can have three such generally orthogonal curvo-planar glazing substrate portions. Each portion can meet the two other substrate portions such that all three portions meet in a suitcase corner, i.e, a rounded three-dimensional curve. The non-transparent area of the frit film may be positioned on the complex curvo-planar shape as desired to enhance the aesthetic appearance of the module. From the foregoing disclosure and detailed description of certain preferred embodiments, it will be apparent that various modifications, additions and other alternative embodiments are possible without departing from the true scope and spirit of the invention. For example, encapsulated plastic glazing modules may have patterns on frit film tailored to individual tastes. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An encapsulated plastic glazing window module for a motor vehicle having an exterior surface, comprising, in combination:

a glazing assembly having an exterior surface, an interior surface and a perimeter, comprising, a transparent plastic glazing substrate having an interior side and an exterior side, and a frit film positioned on at least a portion of the glazing substrate, the frit film having a carrier web, the carrier web having with a generally non-transparent area;

an encapsulation frame comprising thermoplastic material encapsulating at least a portion of a perimeter of the glazing assembly; and attachment means secured to the encapsulation frame for attaching the glazing assembly to a motor vehicle.

2. The encapsulated plastic glazing window module of claim 1 wherein the glazing assembly is encapsulated by the thermoplastic material on a portion of the interior surface.

3. The encapsulated plastic glazing window module of claim 2 wherein the glazing assembly is encapsulated by the thermoplastic material on a portion of the interior surface, a portion of the exterior surface and the perimeter.

4. The encapsulated plastic glazing window module of claim 1 further comprising a primer between the encapsulation frame and the glazing assembly.

5. The encapsulated plastic glazing window module of claim 1 wherein the exterior surface of the glazing assembly is substantially flush with the exterior surface of a motor vehicle.

6. The encapsulated plastic glazing window module of claim 1 wherein the glazing assembly is curvo-planar shaped.

7. The encapsulated plastic glazing window module of claim 1 wherein the transparent plastic glazing substrate has first, second and third curvo-planar portions, each at generally right angles to another of the curvo-planar portions.

8. The encapsulated plastic glazing window module of claim 7 wherein the first, second and third curvo-planar portions meet at a suitcase corner.

9. The encapsulated plastic glazing window module of claim 8 further comprising an abrasion resistant material coating the glazing assembly.

10. The encapsulated plastic glazing window module of claim 1 wherein the frit film is on at least a portion of the interior side of the plastic glazing substrate, and the attachment means for attaching the glazing assembly is shielded from exterior view by the non-transparent area of the frit film.

11. The encapsulated plastic glazing window module of claim 1 wherein the glazing substrate is polycarbonate.

12. The encapsulated plastic glazing window module of claim 1 wherein the carrier web is a sheet of generally transparent polycarbonate having a thickness sufficient to be semi-rigid in a free state and the non-transparent area comprises a non-transparent dye.

13. The encapsulated plastic glazing window module of claim 1 further comprising an abrasion resistant material coating and bonded to the glazing substrate and the frit film.

14. The encapsulated plastic glazing window module of claim 13 wherein the abrasion resistant material is an organically modified ceramic coating and bonded to each surface of the glazing assembly.

15. The encapsulated plastic glazing window module of claim 1 wherein the plastic glazing substrate has unitary radial projections defining a series of circumferentially spaced perimeter vents, wherein the thermoplastic material is positioned in and around the perimeter vents to form a positive mechanical interlock between the plastic glazing substrate and the encapsulation frame.

16. The encapsulated plastic glazing window module of claim 15 further comprising a perimeter ring connecting the projections extending circumferentially around the transparent plastic glazing substrate.

17. The encapsulated plastic glazing window module of claim 1 further comprising a peripheral integrity insert in the encapsulation frame.

18. The encapsulated plastic glazing window module of claim 17 wherein the peripheral integrity insert is a C-shaped channel positioned peripherally on the interior surface of the glazing assembly.

19. The encapsulated plastic glazing window module of claim 18 wherein the attachment means comprises mounting studs embedded in the encapsulation frame near the peripheral integrity insert.

20. The encapsulated plastic glazing window module of claim 1 wherein the exterior surface of the glazing assembly has a uniform gloss.

21. The encapsulated plastic glazing window module of claim 1 wherein a portion of the carrier web is transparent.

22. The encapsulated plastic glazing window module of claim 1 wherein the carrier web extends in an unbroken annulus at the perimeter of the glazing assembly.

23. An encapsulated plastic glazing module for a motor vehicle comprising, in combination:

a glazing assembly, comprising a transparent plastic glazing substrate having radial projections defining a series of perimeter vents;

an encapsulation frame comprising a thermoplastic material positioned in and around the perimeter vents to form a positive mechanical interlock between the plastic glazing substrate and the encapsulation frame; and attachment means secured to the encapsulation frame for attaching the glazing assembly to a motor vehicle.

24. The encapsulated plastic glazing window module of claim 23 further comprising a perimeter ring of plastic glazing substrate unitary with the radial projections.

25. The encapsulated plastic glazing module of claim 23 wherein the glazing assembly further comprises an abrasion resistant material coating the plastic glazing layer.

26. An encapsulated plastic glazing window module comprising, in combination:

a glazing assembly having a surface and a perimeter comprising, a transparent plastic glazing substrate and a frit film positioned on at least a portion of the glazing substrate, the frit film having a carrier web with, the carrier web having a generally non-transparent portion;

an encapsulation frame comprising thermoplastic material encapsulating at least a portion of a perimeter of the glazing assembly; and an abrasion resistant material coating and bonded to a surface of the glazing assembly.

27. An encapsulated plastic glazing window module for a motor vehicle comprising, in combination:

a glazing assembly comprising a transparent plastic glazing substrate having an interior side and an exterior side;

an abrasion resistant material coating at least one of the exterior side and the interior side of the glazing substrate;

a frit film positioned between the glazing substrate and the abrasion resistant material, the frit film having a carrier web and a generally non-transparent area;

an encapsulation frame comprising thermoplastic material encapsulating at least a portion of the glazing assembly; and attachment means secured to the encapsulation frame for attaching the glazing assembly to a motor vehicle.

* * * * *